3,126,413
REMOVAL OF CALCIUM AND MAGNESIUM IMPURITIES FROM AND CATALYTIC REDUCTIVE ALKYLATION OF NITROANILINE
Robert P. Zimmerman, Downers Grove, Ill., assignor to Universal Oil Products Company, Des Plaines, Ill., a corporation of Delaware
No Drawing. Filed Sept. 14, 1959, Ser. No. 839,591
8 Claims. (Cl. 260—577)

This invention relates to an improvement in the catalytic reductive alkylation of nitroaniline with a carbonyl compound.

Products formed by the reductive alkylation of nitroaniline with hydrogen and carbonyl compounds, including ketones and aldehydes, are desirable for various uses. For example, the reductive alkylation of p-nitroaniline with a ketone produces an N,N'-di-sec-alkyl-p-phenylenediamine which is very desirable as an inhibitor to prevent oxidative deterioration of unstable organic compounds. Specifically, the reductive alkylation of p-nitroaniline with methyl ethyl ketone produces N,N'-di-sec-butyl-p-phenylenediamine which is an effective inhibitor for preventing oxidative deterioration of motor fuel and particularly cracked gasoline. Another example is the reductive alkylation of p-nitroaniline with methyl hexyl ketone or ethyl amyl ketone which produces N,N'-di-2-octyl-p-phenylenediamine or N,N'-di-3-(5-methylheptyl)-p-phenylenediamine, respectively, which are effective inhibitors to prevent the cracking of rubber due to ozone. These are illustrative examples of specific reductive alkylation products. Other reductive alkylation products of nitroaniline with a carbonyl compound may find utility as inhibitors, dyes and intermediates in the preparation of pharmaceuticals.

The reductive alkylation process is effected in the presence of a catalyst. While any suitable catalyst may be employed, a preferred catalyst contains platinum, more particularly a composite of platinum and alumina, which may or may not contain halogen, and particularly combined fluorine and/or combined chlorine, which catalyst had been reduced prior to use by high temperature treatment in a reducing atmosphere, particularly hydrogen and/or hydrocarbons. A preferred catalyst in this class comprises a composite of alumina, from about 0.01% to about 10% and more particularly from about 0.1% to about 2% by weight of platinum and from about 0.1% to about 10% and more particularly from about 0.2% to about 4% by weight of fluorine and/or chlorine, the halogen being present in combined form. While alumina is preferred for compositing with platinum, it is understood that other suitable carriers or supports may be used and may be selected from silica, zirconia, thoria, zinc oxide, mixtures of silica and alumina or mixtures of silica and/or alumina with one or more of the last-mentioned oxides. In some cases the mixed catalysts are subjected to high temperature treatment, in the presence or absence of steam, in order to reduce the cracking activity of the mixture. Another catalyst which is used for effecting the reductive alkylation comprises an intimate mixture of copper oxide, chromium oxide and barium oxide. Still other catalysts include nickel, nickel-kieselguhr composite, nickel sulfide, copper sulfide, molybdenum sulfide, and those containing palladium, etc.

It had been observed that the catalyst used to effect the reductive alkylation reaction becomes deactivated. An extensive investigation was undertaken to determine the cause for such deactivation. The catalyst was carefully studied and no apparent cause for such deactivation appeared. The ketone used in the reaction also was carefully analyzed and no reason appeared for the catalyst deactivation from this source. The p-nitroaniline similarly was carefully analyzed and was found to contain basic impurities. Analysis of the deactivated catalyst showed an abnormal content of basic impurities and it was therefore determined that the cause of the deactivation of the catalyst was due to the basic impurities contained in the p-nitroaniline. Accordingly, the discovery of the cause of the deactivation of the catalyst and the source of the impurities constitute an important element in the present invention.

p-Nitroaniline is a solid, having a melting point of about 147° C. As another important element of the present invention, the p-nitroaniline is formed as a solution in the carbonyl compound and then is treated in a specific manner to remove the basic impurities originally contained in the p-nitroaniline. This novel method of treating the p-nitroaniline to remove the basic impurities offers numerous advantages. In the first place, improved purification is obtained by treating the p-nitroaniline in a liquid state. Secondly, the solution of the p-nitroaniline in the carbonyl compound, after treatment to remove the basic impurities, is in a form which is supplied directly to the reductive alkylation step of the process. This has the additional advantage of not introducing undesired materials into the reductive alkylation or of otherwise necessitating the separation of the p-nitroaniline from other solvents prior to use in the reductive alkylation. Accordingly, the novel step of forming the p-nitroaniline as a solution in the carbonyl compound constitutes another important element of the present invention.

The solution of p-nitroaniline in the carbonyl compound is purified by means of a cation exchange resin. This method of treatment serves to effectively reduce the basic impurities from the solution. In contrast, the use of a bed of conventional treating agents such as clays, fuller's earth, alumina, silica, etc., removes an insufficient portion of the basic impurities under normal treating conditions. Accordingly, such treating agents would have to be used in such large quantities that their use is commercially impractical. From the above, it will be seen that another important element of the present invention is the use of the cation exchange resin for treating the solution of p-nitroaniline and carbonyl compound.

While p-nitroaniline is preferred for use in reductive alkylation, it is understood that the present invention also may be used in connection with the reductive alkylation of ortho-nitroaniline or meta-nitroaniline which contain basic impurities. p-Nitroaniline is preferred for the manufacture of the inhibitors or antiozonants hereinbefore specifically set forth.

Any suitable carbonyl compound is used in the reductive alkylation reaction. Ketones are particularly preferred when it is desired to form N,N'-di-sec-alkyl-p-phenylenediamine. Suitable ketones include acetone, methyl ethyl ketone, methyl propyl ketone, methyl butyl ketone, methyl amyl ketone, methyl hexyl ketone, methyl heptyl ketone, methyl octyl ketone, etc., diethyl ketone, ethyl propyl ketone, ethyl butyl ketone, ethyl amyl ketone, ethyl hexyl ketone, ethyl heptyl ketone, etc., dipropyl ketone, propyl butyl ketone, propyl amyl ketone, propyl hexyl ketone, etc., dibutyl ketone, butyl amyl ketone, butyl hexyl ketone, etc. Other suitable but not necessarily equivalent ketones comprise cyclic ketones including cyclohexanone, benzophenone, etc., alkyl aryl ketones, alkylcycloalkyl ketones, diaryl ketones, aryl cycloalkyl ketones, etc., including compounds as acetophenone, ethyl phenyl ketone, propyl phenyl ketone, butyl phenyl ketone, amyl phenyl ketone, etc., methyl cyclohexyl ketone, ethyl cyclohexyl ketone, propyl cyclohexyl ketone, butyl cyclohexyl ketone, etc. It is understood that mixtures of ketones may be utilized when desired.

The aldehydes are preferred when it is desired to form N,N,N',N'-tetraalkyl phenylenediamines. Suitable aldehydes include formaldehyde, acetaldehyde, propionaldehyde, butyraldehyde, valeraldehyde, etc. It is understood that the particular aldehyde to be employed will depend upon the particular product desired. Similarly, it is understood that mixtures of aldehydes may be utilized when desired.

In accordance with the present invention, a solution of nitroaniline in the carbonyl compound is prepared. The reductive alkylation generally is effected using an excess of ketone to nitroaniline and, in one embodiment of the invention, the solution of nitroaniline in carbonyl compound is prepared in the proportions desired for use in the reductive alkylation. In this embodiment the solution, after treatment to remove basic impurities, then may be passed directly to the reductive alkylation step for reaction therein. However, in another embodiment of the invention, a solution of nitroaniline in any suitable concentration of carbonyl compound may be prepared, and additional carbonyl compound is commingled with the solution, after treatment to remove basic impurities, to form a mixture of the desired proportions. The latter operation offers the advantage of requiring a lesser quantity of the solution to be treated with the cation exchange resin.

In a preferred embodiment a small quantity of water is included in the solution. The amount of water will range from about 1% to about 10% and preferably from 2% to 6% by volume of the solution. This serves to precipitate out of solution some of the impurities contained in the p-nitroaniline and thereby will reduce the amount of impurities which will be removed by the cation exchange resin and, accordingly, will increase the life of the cation exchange resin correspondingly.

The solution of nitroaniline in carbonyl compound is treated with any suitable cation exchange resin to remove the basic impurities. As will be exemplified in the appended examples, calcium and magnesium appear to be most harmful. Accordingly, any cation exchange resin which will remove these impurities may be used in accordance with the present invention. A particularly suitable cation exchange resin is a sulfonated copolymer of styrene and divinylbenzene, marketed under the trade name of "Dowex 50–X8." This resin contains 8% cross linkage; that is, it is composed of 8% divinylbenzene and 92% of styrene. It is of medium porosity and is supplied commercially in the form of 20–50 mesh spheres, the mesh size being according to the range of U.S. Standard screen sizes. It is furnished either in the $H^+$ or $Na^+$ form. Either form may be used in accordance with the present invention, the $H^+$ form being preferred. The cation exchange resin has a thermal stability up to 150° C.

Other suitable cation exchange resins are a series of materials in which the percent of divinylbenzene in the copolymer ranges from 1% to 16% or more. Still other cation exchange resins include those formed by the condensation of aldehydes, such as formaldehyde, with phenols or phenol sulfonic acid or with phenol-carboxylic acids. Sulfonated polystyrene cation exchange resins are available commercially under the trade name of "Amberlite IR–120." Still other cation exchange resins are available under the trade names of "Amberlite IR–100," "Amberlite IR–105" (sulfonated phenolic resin), "Zeo-Karb-H" (sulfonated coal), "Nalcite HRC," etc. No invention is being claimed herein for the cation exchange resin per se and, accordingly, need not be described further. Any suitable cation exchange resin which will remove the calcium and magnesium impurities may be employed in accordance with the present invention and accordingly may be selected from any of those presently available commercially or, if desired, may be specially prepared for this purpose.

The solution of nitroaniline and carbonyl compound is treated with the cation exchange resin in any suitable manner. In general, this treatment is effected at ambient temperature, although an elevated temperature up to about 95° C. may be employed. The pressure generally will be slightly superatmospheric and thus will range from about 5 to about 50 p.s.i.g., although higher pressures may be employed and may range up to 1000 p.s.i.g. or more. With superatmospheric pressures, higher temperatures may be employed when desired.

The solution of nitroaniline and carbonyl compound is treated with the cation exchange resin in any suitable manner. While a batch type operation may be employed, this step of the process preferably is conducted in a continuous manner, in which the solution of nitroaniline and carbonyl compound is passed, in either downward or upward flow, through a bed of cation exchange resin. When the concentration of basic impurities in the effluent from the treating zone, reaches an undesired concentration, the flow of solution is stopped. In some cases, it is preferred to employ two or more separate zones containing the cation exchange resin and to treat the solution in one or more zones, while the resin in the other zone or zones is being regenerated. Regeneration of the cation exchange resin after use is effected in any conventional manner, such as by treatment with a suitable acidic reagent, etc., the specific method depending upon the particular cation exchange resin employed. After regeneration the cation exchange resin is used for the purification of further quantities of the solution of nitroaniline and carbonyl compound.

As hereinbefore set forth, in one embodiment the solution will contain the nitroaniline and carbonyl compound in the mol proportion desired for reaction in the reductive alkylation step of the process. When N,N'-dialkyl-phenylenediamines are desired, the stoichiometric requirements are 2 mol proportions of carbonyl compound per mol proportion of nitroaniline. However, the carbonyl compound is used in excess and thus may range from about 3 to 20 or more and preferably 4 to 10 mol proportions of carbonyl compound per mol proportion of nitroaniline. In another embodiment, the solution of nitroaniline and carbonyl compound may contain the carbonyl compound in a mol proportion below that desired for use in the reductive alkylation and, after treatment to remove basic impurities, the additional quantity of carbonyl compound is commingled with the solution and then sent to the reductive alkylation step.

The reductive alkylation of nitroaniline with carbonyl compound is readily effected at a temperature of from about 110° to about 250° C., preferably from about 120° to about 200° C., and a pressure of from about 100 to 3000 p.s.i.g. or more. The specific temperature to be employed generally will depend upon the particular reactants and catalyst and, in some cases, satisfactory results may be obtained at temperatures below or above those specifically set forth and thus may range from about 90° to about 260° F. The reductive alkylation is effected in the presence of hydrogen, the hydrogen being used in an amount of at least 4 mols of hydrogen per mol of nitroaniline. When complete reductive alkylation is desired, at least 5 mols of hydrogen per mol of nitroaniline is necessary. In general, it is preferred to use an excess of hydrogen and thus may range up to 3000 pounds or more of hydrogen pressure.

While the reductive alkylation may be effected in a batch type operation, it preferably is effected in a continuous type process, in which the catalyst is disposed as a fixed bed in reaction tubes or reaction chambers and the reactants, at the desired temperature and pressure, are passed therethrough in either upward or downward flow. In another method the catalyst may be used as a moving bed and the reactants passed either concurrently or countercurrently thereto. In still another method, the catalyst is maintained in a fluidized state in the reaction zone. In still another method the catalyst is carried into the reaction zone as a slurry in the reactants.

Following the reductive alkylation reaction, the products are fractionated to separate the desired alkylated product from hydrogen, excess carbonyl compound and other products. The hydrogen advantageously is recycled for further use in the process. Likewise any excess carbonyl compound preferably is recycled for further conversion in the process, either by being supplied directly thereto or by being used to form a solution of the nitroaniline therein.

The following examples are introduced to illustrate further the novelty and utility of the present invention but not with the intention of unduly limiting the same.

Example I p-Nitroaniline was reductively alkylated with methyl ethyl ketone in a continuous process utilizing a fixed bed of catalyst. The catalyst comprised alumina, about 0.3% by weight of platinum and about 0.3% by weight of combined fluorine, which catalyst previously had been reduced by high temperature treatment with hydrogen and hydrocarbons. The methyl ethyl ketone was used in a mol ratio to p-nitroaniline of 8:1 and the reaction was effected at an outlet temperature of about 175° C. and a hydrogen pressure of about 1000 p.s.i.g.

The catalyst became deactivated prematurely and the spent catalyst then was analyzed by emission spectra and it was found that, as compared to the catalyst prior to use, the weight percent of calcium on the spent catalyst increased from less than 0.03% to 0.9% and the weight percent of magnesium on the spent catalyst increased from less than 0.01% to 0.06%. These impurities were visible as fine powder deposited on the surface of the catalyst and apparently detrimentally affected the surface area of the catalyst. This is shown by a comparison of the catalyst before and after use in which the surface area was reduced from 170 to less than 62 m.$^2$/g. The pore volume was reduced from 0.542 to 0.083 cm.$^3$/g. The pore diameter was reduced from 127 to 54 angstroms.

Example II

After determining the cause of the deactivation of the catalyst, it was found that these impurities were being introduced in the p-nitroaniline used as a reactant in the reductive alkylation. A sample of the p-nitroaniline supplied commercially and used as a reactant in the above process was ashed and analyzed by emission spectra. It was found to contain 1030 p.p.m. of calcium and 21.1 p.p.m. of magnesium. The high calcium content apparently results from the use of a calcium compound during the commercial manufacture of p-nitroaniline.

Example III

A portion of the p-nitroaniline was dissolved in methyl ethyl ketone and water in the following proportions: 100 grams of p-nitroaniline, 380 grams of methyl ethyl ketone and 20 grams of water. The solution was allowed to stand to determine whether the impurities would settle out of solution. Some precipitation of solids occurred, and the substantially clear supernatant was then decanted. A portion of this was heated under vacuum to flash off methyl ethyl ketone and water. The solid p-nitroaniline remaining then was ashed and inspected by emission spectra. This served to reduce the calcium from 1030 p.p.m. to 86.5 p.p.m. and the magnesium from 21.1 to 5.8 p.p.m. While this is a substantial reduction, it still leaves the calcium and magnesium in a concentration which will serve to prematurely deactivate the catalyst.

Example IV

In another attempt to remove the basic impurities, another portion of the solution described in Example III was filtered through a dense paper on a Büchner funnel. A portion of the filtrate was flashed to remove the methyl ethyl ketone and water, and the remaining p-nitroaniline was ashed and inspected by emission spectra. This served to reduce the calcium to 83 p.p.m. and the magnesium to 1.1 p.p.m. One explanation for the remaining high calcium content is that the calcium salts are partially soluble in methyl ethyl ketone, particularly in the presence of water, and accordingly are not completely removed in a filtration treatment. As hereinbefore set forth, this method of treating the p-nitroaniline does not appear to remove the impurities to the desired extent.

Example V

A portion of the filtrate described in Example IV was treated with a cation exchange resin. The filtrate was passed downwardly through a bed of "Dowex 50–X8" which, as hereinbefore set forth, is a sulfonated styrene-divinylbenzene resin of medium porosity. The effluent from the cation exchange resin was flashed to remove solvent and the resultant p-nitroaniline was ashed and inspected by emission spectra.

Treatment in accordance with this method reduced the calcium to 0.3 p.p.m. and the magnesium to 0.2 p.p.m. Other metallic contaminants also were reduced by this treatment. However, these other metallic composites were present in such small concentrations that they are not believed to be of major effect, especially because the build up thereof on the spent catalyst was not excessive. In contrast, the increase in calcium and magnesium was excessive as shown by the preceding examples.

I claim as my invention:

1. In the catalytic reductive alkylation of nitroaniline containing calcium and magnesium impurities with a carbonyl compound selected from the group consisting of ketones and aldehydes, the improvement which comprises forming a solution of said nitroaniline in said carbonyl compound, treating said solution with a cation exchange resin to remove calcium and magnesium impurities originally contained in said nitroaniline, withdrawing treated solution of nitroaniline in said carbonyl compound reduced in impurities, and subjecting the same with hydrogen to catalytic reductive alkylation at a temperature of from about 110° to about 250° C. and a pressure of from about 100 to 3000 p.s.i.g.

2. The process of claim 1 further characterized in that said nitroaniline is p-nitroaniline.

3. In the catalytic reductive alkylation of nitroaniline containing calcium and magnesium impurities with a carbonyl compound selected from the group consisting of ketones and aldehydes, the improvement which comprises forming a solution of said nitroaniline in said carbonyl compound, treating said solution with a cation exchange resin to remove calcium and magnesium impurities originally contained in said nitroaniline, withdrawing treated solution of nitroaniline in said carbonyl compound reduced in impurities, and subjecting the same with hydrogen to catalytic reductive alkylation in the presence of a platinum-containing catalyst at a temperature of from about 110° to about 250° C. and a pressure of from about 100 to 3000 p.s.i.g.

4. The improvement of claim 3 further characterized in that said nitroaniline is p-nitroaniline.

5. In the catalytic reductive alkylation of p-nitroaniline containing calcium and magnesium impurities with a ketone, the improvement which comprises forming a solution of said p-nitroaniline in said ketone, treating said solution with a cation exchange resin to remove calcium and magnesium impurities originally contained in said p-nitroaniline, withdrawing a treated solution of p-nitroaniline in said ketone reduced in impurities, and subjecting the same with hydrogen to reductive alkylation in the presence of a platinum-containing catalyst at a temperature of from about 110° to about 250° C. and a pressure of from about 100 to 3000 p.s.i.g.

6. In the preparation of N,N'-di-sec-butyl-p-phenylenediamine by the catalytic reductive alkylation of p-nitroaniline containing calcium and magnesium impurities with methyl ethyl ketone, the improvement of forming a solution of p-nitroaniline in methyl ethyl ketone, treating said solution with a sulfonated styrene-divinylbenzene copolymer cation exchange resin to remove calcium and magnesium impurities originally contained in said p-nitroaniline, withdrawing a treated solution of p-nitroaniline in methyl ethyl ketone reduced in impurities, and subjecting the same with hydrogen to reductive alkylation in the presence of a platinum-containing catalyst at a temperature of from about 120° to about 200° C. and a pressure of from about 100 to 3000 p.s.i.g.

7. In the preparation of N,N'-di-2-octyl-p-phenylenediamine by the catalytic reductive alkylation of p-nitroaniline containing calcium and magnesium impurities with methyl hexyl ketone, the improvement of forming a solution of p-nitroaniline in methyl hexyl ketone, treating said solution with a sulfonated styrene-divinylbenzene copolymer cation exchange resin to remove calcium and magnesium impurities originally contained in said p-nitroaniline, withdrawing a treated solution of p-nitroaniline in methyl hexyl ketone reduced in impurities, and subjecting the same with hydrogen to reductive alkylation in the presence of a platinum-containing catalyst at a temperature of from about 120° to about 200° C. and a pressure of from about 100 to 3000 p.s.i.g.

8. In the preparation of N,N'-di-3-(5-methylheptyl)-p-phenylenediamine by the catalytic reductive alkylation of p-nitroaniline containing calcium and magnesium impurities with ethyl amyl ketone, the improvement of forming a solution of p-nitroaniline in ethyl amyl ketone, treating said solution with a sulfonated styrene-divinylbenzene copolymer cation exchange resin to remove calcium and magnesium impurities originally contained in said p-nitroaniline, withdrawing a treated solution of p-nitroaniline in ethyl amyl ketone reduced in impurities, and subjecting the same with hydrogen to reductive alkylation in the presence of a platinum-containing catalyst at a temperature of from about 120° to about 200° C. and a pressure of from about 100 to 3000 p.s.i.g.

References Cited in the file of this patent

UNITED STATES PATENTS

| | | |
|---|---|---|
| 2,253,999 | Bowman et al. | Aug. 26, 1941 |
| 2,380,420 | Emerson | July 31, 1945 |
| 2,381,015 | Von Bramer et al. | Aug. 7, 1945 |
| 2,671,110 | Zbornik et al. | Mar. 2, 1954 |
| 2,822,396 | Dent | Feb. 4, 1958 |
| 2,867,604 | Rosenwald et al. | Jan. 6, 1959 |

OTHER REFERENCES

Jour. Ind. and Eng. Chem., page 51 of Adv. Sec. (1942).

Calmon et al.: Ion Exchanges in Org. and Biochemistry, Interscience Publishers, New York, pages 640–642 (1957).